United States Patent [19]

Oagley

[11] 4,138,076

[45] Feb. 6, 1979

[54] STAPLE CASSETTE

[75] Inventor: Jack R. Oagley, Rochester, N.Y.

[73] Assignee: Xerox Corporation, Stamford, Conn.

[21] Appl. No.: 825,354

[22] Filed: Aug. 17, 1977

Related U.S. Application Data

[63] Continuation of Ser. No. 717,316, Aug. 24, 1976, abandoned.

[51] Int. Cl.[2] ........................ B65H 17/52; F16B 15/08

[52] U.S. Cl. .................................... 242/103; 206/390; 227/136; 242/1

[58] Field of Search .................... 242/103, 1, 117, 86.2, 242/54, 55; 206/390; 227/135, 136, 137, 120, 127, 123

[56] References Cited

U.S. PATENT DOCUMENTS

| | | | |
|---|---|---|---|
| 186,663 | 1/1877 | Copeland | 242/103 |
| 848,239 | 3/1907 | Grimsrud | 242/86.2 |
| 1,281,007 | 10/1918 | Hooker | 242/117 |
| 2,216,819 | 10/1940 | Le Bus | 242/117 |

*Primary Examiner*—George F. Mautz

[57] ABSTRACT

A cassette for pre-formed U-shaped staples comprising a core member formed with a helical rib and a web of pre-formed U-shaped staple elements wound on said core member in helical fashion following the rib formed on said core member. A tape attached to the web serves to apply rotative movement to the core member which moves axially for dispensing of the staples.

1 Claim, 2 Drawing Figures

STAPLE CASSETTE

This is a continuation of application Ser. No. 717,316, filed Aug. 24, 1976, now abandoned.

This invention relates to an improved stoarge for a web of pre-formed staples to provide a housing for a large amount of pre-formed staples in a compact package. More specifically, the invention is an improvement to the flexible cartridge or refill for stapling machines disclosed in U.S. Pat. No. 2,754,445 to Lerner issued May 1, 1956.

It is known to form staples in an elastic belt or strip which is adapted to be wound on itself for loading into a stapling machine as described in U.S. Pat. No. 2,743,445 to Lerner. With the structure of the patent, an adhesive is utilized between adjacent staple elements for joining thereof. When adjacent staple elements are adhered together with the sticky adhesive the assembly is then rolled into a compact roll. It has been found that adjacent plies of the roll have a tendency to stick together. This causes serious disadvantages in the operation of the staple roll. Still another disadvantage of this type of roll is that when pre-formed staples have a U-shaped form as with some embodiments it is difficult, if not impossible, to wind the pre-formed staples into a roll configuration.

In accordance with the present invention, a web of pre-formed U-shaped staples is housed in a cylindrical cassette. The cassette walls have an acme type thread cavity that retains a continuous web of the pre-formed U-shaped staples. The staples are removed by rotating the cylindrical cassette, thus, pulling the staples from the housing in a continuous flow. In this manner, a large quantity of pre-formed staples can be stored in a compact package.

It is a principal object of the present invention to improve the storage of pre-formed staples.

It is another object of the present invention to provide a servicable and flexible staple element strip adapted to form a cartridge. It is another object of the present invention to enable pre-formed staples to be wound in cassette form without sticking.

These and other objects of the invention will become apparent from the description which follows when taken in conjunction with the accompanying drawing in which.

Figure 1:
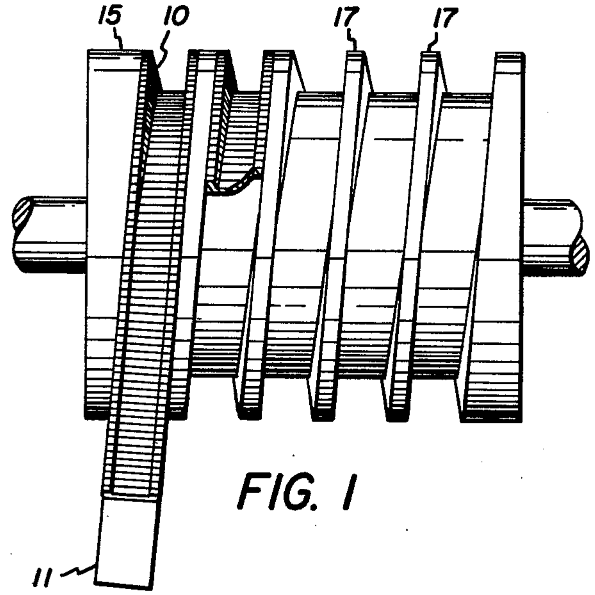
FIG. 1 is a side view of the staple cassette according to the invention.
Figure 2:
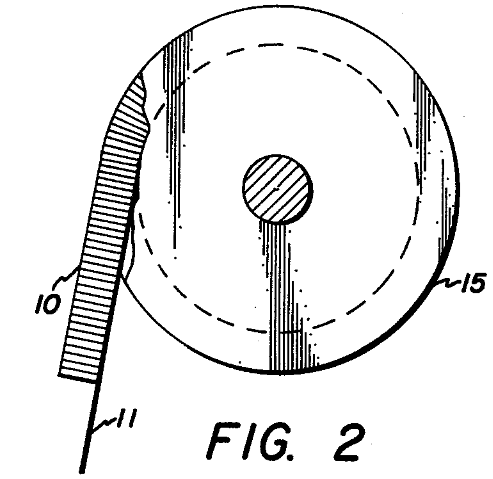
FIG. 2 is an end view of the cassette which is partially in section to illustrate certain details thereof.

Referring to the drawing, in FIG. 1 there is shown a plurality of staple elements 10 which are U-shaped. The staple elements are joined in a suitable manner as by an adhesive tape 11. Alternatively the staple elements can be held together by a weld section or any other suitable way. It is only important that the staple elements form a continuous web or belt. The web is wound onto a core member 15 which is formed with helical rib 17. Upon pulling of tape 11 core member 15 is caused to rotate and move axially. As a result, the staple elements are removed for dispensing from a fixed path to a staple machine or the like.

It will now be appreicated that the present invention enables an elastic, deformable, flexible, stretchable stack or roll of staples which are U-shaped to be arranged in a cartridge form. With a helical core as described above, there is provided a storage for a large amount of the pre-formed U-shaped staples and a cassette device for dispensing same.

While the invention has been described with reference to the structure disclosed herein it is not intended that the present invention be confined to details set forth in this application but it is intended to cover modifications or changes as may come within the scope of the following claims.

What is claimed is:

1. An improved device for storing and feeding pre-formed U-shaped staple elements comprising a generally cylindrical core member formed with a helical rib and being movable axially, a web of pre-formed U-shaped staple elements wound on said core member in helical fashion following the rib formed on said core member, said rib having a height and pitch coextensive with the height and width, respectively, of said U-shaped staple elements such that the rib houses the staple elements, and a tape attached to said staple elements, said tape being adapted when pulled to cause rotation of said core member and axial movement thereof to feed said staple elements along a fixed path.

* * * * *